(No Model.) 2 Sheets—Sheet 1.

J. S. OLIVER.
SMELTING FURNACE.

No. 480,699. Patented Aug. 9, 1892.

WITNESSES:
C. R. Ferguson
G. C. Thomas

INVENTOR
John S. Oliver.
BY Edwin H. Brown
HIS ATTORNEY (No Model.) 2 Sheets—Sheet 2.

J. S. OLIVER.
SMELTING FURNACE.

No. 480,699. Patented Aug. 9, 1892.

WITNESSES:

INVENTOR
John S. Oliver.
BY
HIS ATTORNEY

UNITED STATES PATENT OFFICE.

JOHN S. OLIVER, OF BROOKLYN, NEW YORK, ASSIGNOR TO JOHN BROOKS, OF BOSTON, MASSACHUSETTS, AND THE OLIVER ALUMINUM COMPANY, OF WEST VIRGINIA.

SMELTING-FURNACE.

SPECIFICATION forming part of Letters Patent No. 480,699, dated August 9, 1892.

Application filed June 15, 1891. Serial No. 396,363. (No model.)

*To all whom it may concern:*

Be it known that I, JOHN S. OLIVER, of Brooklyn, Kings county, and State of New York, have invented a certain new and useful Improvement in Smelting-Furnaces, of which the following is a specification.

I will describe a smelting-furnace embodying my improvement, and then point out the novel features in a claim.

Figure 1:
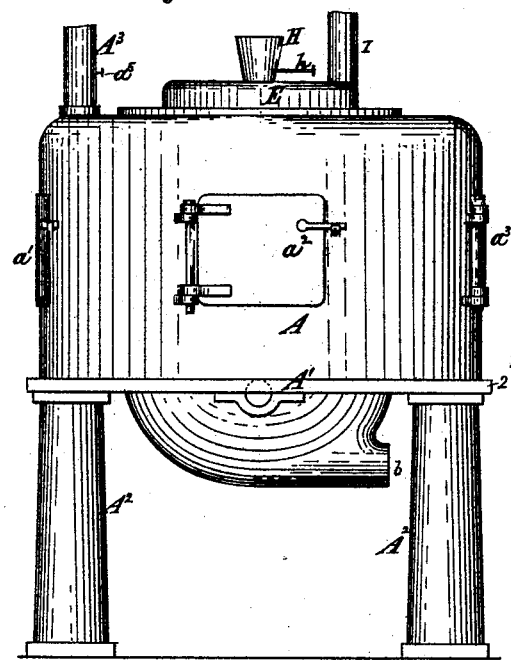
Figure 3:
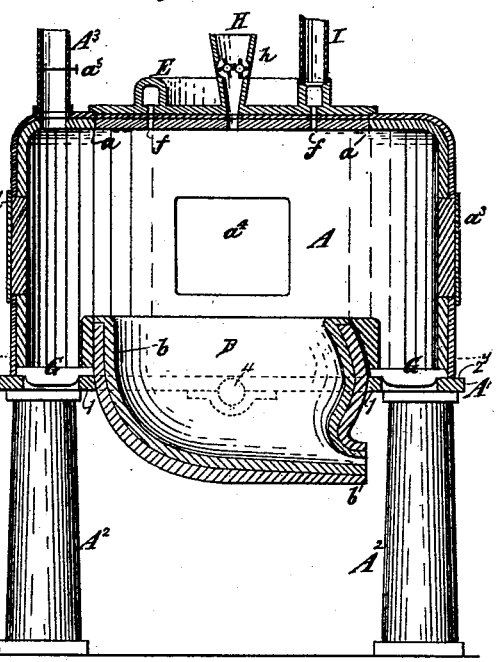
Figure 2:
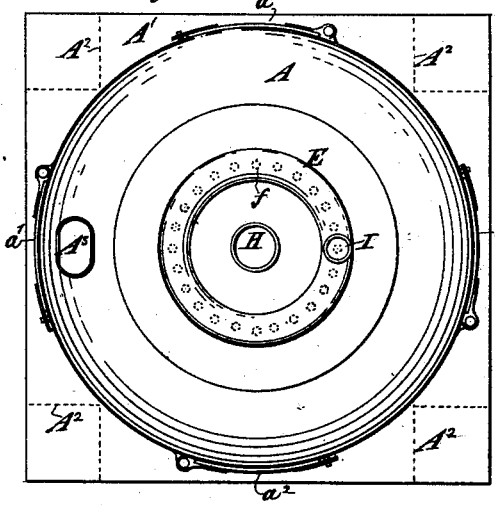
Figure 4:
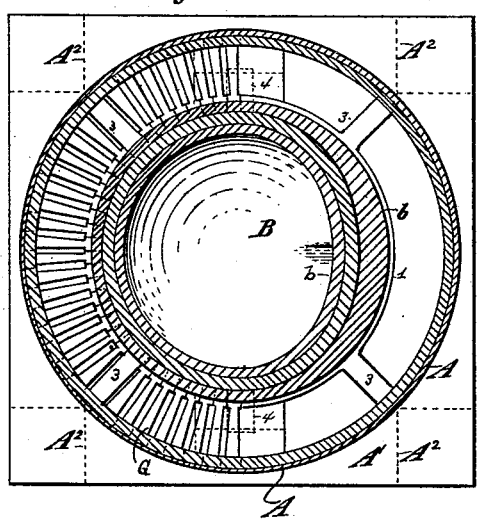
Figure 5:
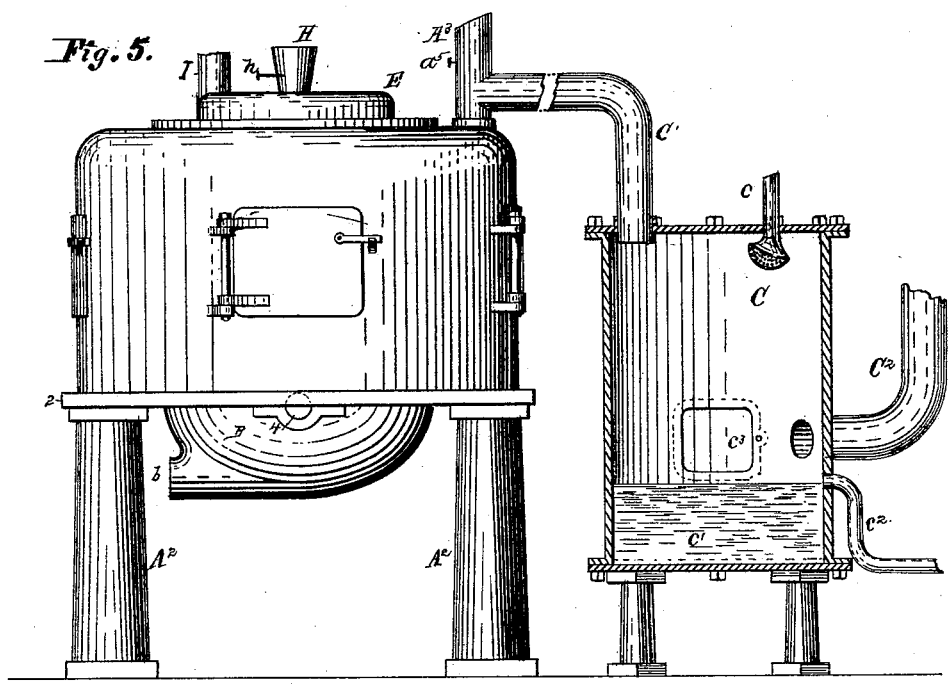
Figure 6:
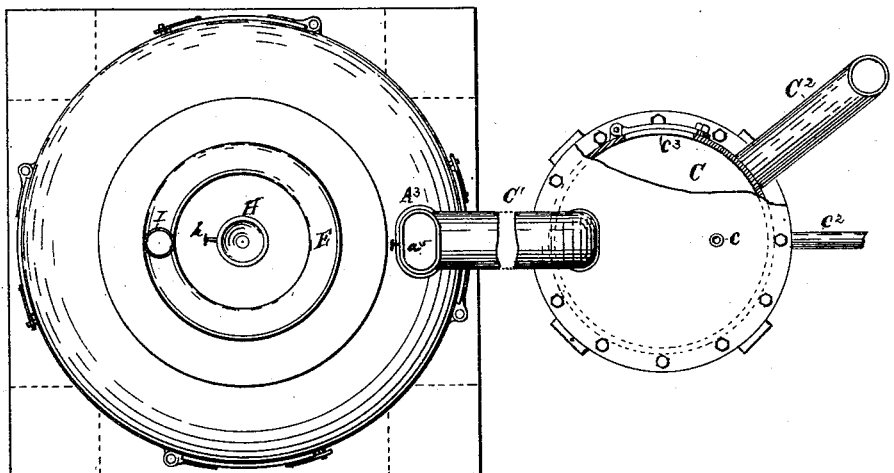

In the accompanying drawings, Figure 1 is a side elevation of a smelting-furnace embodying my improvement. Fig. 2 is a top view of the same. Fig. 3 is a vertical section of the furnace. Fig. 4 is a horizontal section taken at the plane of the dotted line $y\,y$, Fig. 3. Fig. 5 is a side view of a furnace, showing a condenser in vertical section. Fig. 6 is a top view thereof.

Similar letters and numerals of reference designate correponding parts in all the figures.

A designates a chamber, here shown as of cylindric form. It is closed at the top and has a circular opening at the bottom. Around this circular opening it is provided with a number of openings, here shown as fitted with doors $a'\,a^2\,a^3\,a^4$, connected with the chamber by hinges fastened when closed by any appropriate catches. I have shown this chamber as supported on a bed-piece A', resting on columns $A^2$, which in the present instance are four in number. The bed-piece consists of two concentric rings 1 2, united at intervals by radial arms 3. The chamber may be made of cast-iron and lined with clay or other material.

In the lower annular portion of the chamber A a pot B is arranged. This may be made of cast-iron and provided with a lining $b$ of clay. It will be observed that the upper portion of this pot extends above the grate-bars G and that its lower portion protrudes beneath the bottom of the chamber A. The space between the upper portion of the pot and the side or wall of the chamber forms an annular receptacle for fuel supported upon the grate-bars G. Preferably the lining $b$ will extend over the outer side of the upper portion of the pot down to the grate-bars.

The pot may be supported by resting upon the inner ring 1 of the bed-piece A', the inner surface of such ring being contracted downwardly to fit the lower portion of the pot, which is similarly contracted, or the pot may be supported by trunnions 4, and then can be tilted. It will be observed that the lower portion of the pot is rounded and has a tangential discharge-orifice $b'$. This may be closed in any suitable manner—as, for instance, by a plug of clay—and opened whenever it is desired to discharge metal.

The fuel may be supplied to the receptacle, heretofore mentioned, through the holes which are furnished with the doors $a'\,a^2\,a^3\,a^4$. The burning of the fuel in the receptacle will heat the contents of the pot B.

The chamber is shown as provided with a flue $A^3$ for conducting off the products of combustion as may be necessary. As shown, this flue is provided with a damper $a^3$.

The top of the chamber A is provided with a gas-inlet, here shown as consisting of an annular chamber E, between which and the interior of the chamber are apertures of tuyeres $f$, the latter being arranged in a circle corresponding to the chamber E. As here shown, the chamber E is formed integral with a plate constituting a cover for a circular opening $a$ with which the top of the main chamber A is provided, and the apertures $f$ are formed in this cover. The apertures or tuyeres are so disposed as to direct the gas into the contents of the pot—that is, they are arranged in a smaller area than the area of the opening in the pot.

At the center the cover for the opening $a$ is fitted with a hopper or chute H, whereby material to be treated may be introduced into the pot. This chute will preferably be fitted with feeding-rollers $h$, whereby the material may be properly introduced.

The gas-inlet may be supplied with gas by a pipe I. The gas used may be compressed air or any other gas.

This smelting-furnace which I have described is particularly adapted to the smelting of clay for the purpose of obtaining aluminium therefrom. The clay may be supplied to the pot through the chute H. The fuel within the chamber will burn in connection with the gas admitted. The burning of the fuel and the gas within the chamber A will heat the contents of the pot and the gas will carry the flame into the contents of the pot, so that the latter will be very intensely heated, and the contents, while heated, will be put in thorough circulation by the gas, and all portions will consequently be properly heated. As a considerable portion of the aluminium rises in the form of vapor and would escape through the pipe $A^3$ if not arrested, I provide a condenser C, through which the aluminium-vapor and other products of combustion may be directed and the aluminium condensed and saved. This condenser C consists of a receptacle having a pipe C′, communicating with the furnace. As here shown, the pipe C′ communicates with the furnace through the pipe $A^3$ beneath the damper $a^5$, so that when the damper is closed the products of combustion and aluminium-vapor will be directed into the upper portion of the condenser. When the aluminium-vapor enters the condenser, it is met by a stream of water flowing through a pipe $c$, which preferably has a nozzle, and the aluminium is crystallized, thereby causing it to fall to the bottom of the condenser, as at $c′$, and the lighter products of combustion may be carried off through the pipe $C^2$. An overflow-pipe $c^2$ connects with the condenser a short distance above its bottom and is designed to carry off the water used in the condensation, and the product may be removed from the condenser through a door $c^3$.

It will be seen from the foregoing that I provide for smelting the purified, calcined, and impalpable clay powder by means of igniting the oxygen of the air with a carbon fire.

What I claim as my invention, and desire to secure by Letters Patent, is—

In a smelting-furnace, the combination of a chamber, grate-bars in the lower part of the chamber, a pot at the lower part of the chamber and having its bottom below the grate-bars provided with a discharge-outlet, and apertures or tuyeres for admitting gas through the top of the chamber to the pot, substantially as specified.

In testimony whereof I have signed my name to this specification in the presence of two subscribing witnesses.

JOHN S. OLIVER.

Witnesses:
S. O. EDMONDS,
W. M. ILIFF.

It is hereby certified that the name of the assignee in Letters Patent No. 480,699, granted August 9, 1892, upon the application of John S. Oliver, of Brooklyn, New York, for an improvement in "Smelting Furnaces," was erroneously written in the grant "The Oliver Aluminum Company," and that said name should have been written *Oliver Aluminum Company;* and that the said Letters Patent should be read with this correction therein that the same may conform to the record of the case in the Patent Office.

Signed, countersigned, and sealed this 16th day of August, A. D. 1892.

[SEAL.]
CYRUS BUSSEY,
*Assistant Secretary of the Interior.*

Countersigned:
N. L. FROTHINGHAM,
*Acting Commissioner of Patents.*